United States Patent
Jain et al.

(10) Patent No.: US 8,072,974 B1
(45) Date of Patent: Dec. 6, 2011

(54) METHOD AND APPARATUS FOR IMPROVING PACKET PROCESSING PERFORMANCE USING MULTIPLE CONTEXTS

(75) Inventors: Naveen K. Jain, San Jose, CA (US); Venkata Rangavajjhala, Fremont, CA (US)

(73) Assignee: Tellabs San Jose Inc, Naperville, IL (US)

( * ) Notice: Subject to any disclaimer, the term of this patent is extended or adjusted under 35 U.S.C. 154(b) by 544 days.

(21) Appl. No.: 12/175,702

(22) Filed: Jul. 18, 2008

(51) Int. Cl.
*H04L 12/56* (2006.01)

(52) U.S. Cl. ...................................................... 370/389

(58) Field of Classification Search .................. None
See application file for complete search history.

(56) References Cited

U.S. PATENT DOCUMENTS

| | | | |
|---|---|---|---|
| 6,101,599 A * | 8/2000 | Wright et al. ................. | 712/228 |
| 6,513,108 B1 * | 1/2003 | Kerr et al. ....................... | 712/19 |
| 7,187,687 B1 * | 3/2007 | Davis et al. ................... | 370/419 |
| 2008/0002567 A1 * | 1/2008 | Bourlas et al. ................ | 370/208 |

* cited by examiner

*Primary Examiner* — Yong Zhou
(74) *Attorney, Agent, or Firm* — James M. Wu; JM Law Group

(57) ABSTRACT

A network processing device having multiple processing engines capable of providing multi-context parallel processing is disclosed. The device includes a receiver and a packet processor, wherein the receiver is capable of receiving packets at a predefined packet flow rate. The packet processor, in one embodiment, includes multiple processing engines, wherein each processing engine is further configured to include multiple context processing components. The context processing components are used to provide multi-context parallel processing to increase throughput.

13 Claims, 8 Drawing Sheets

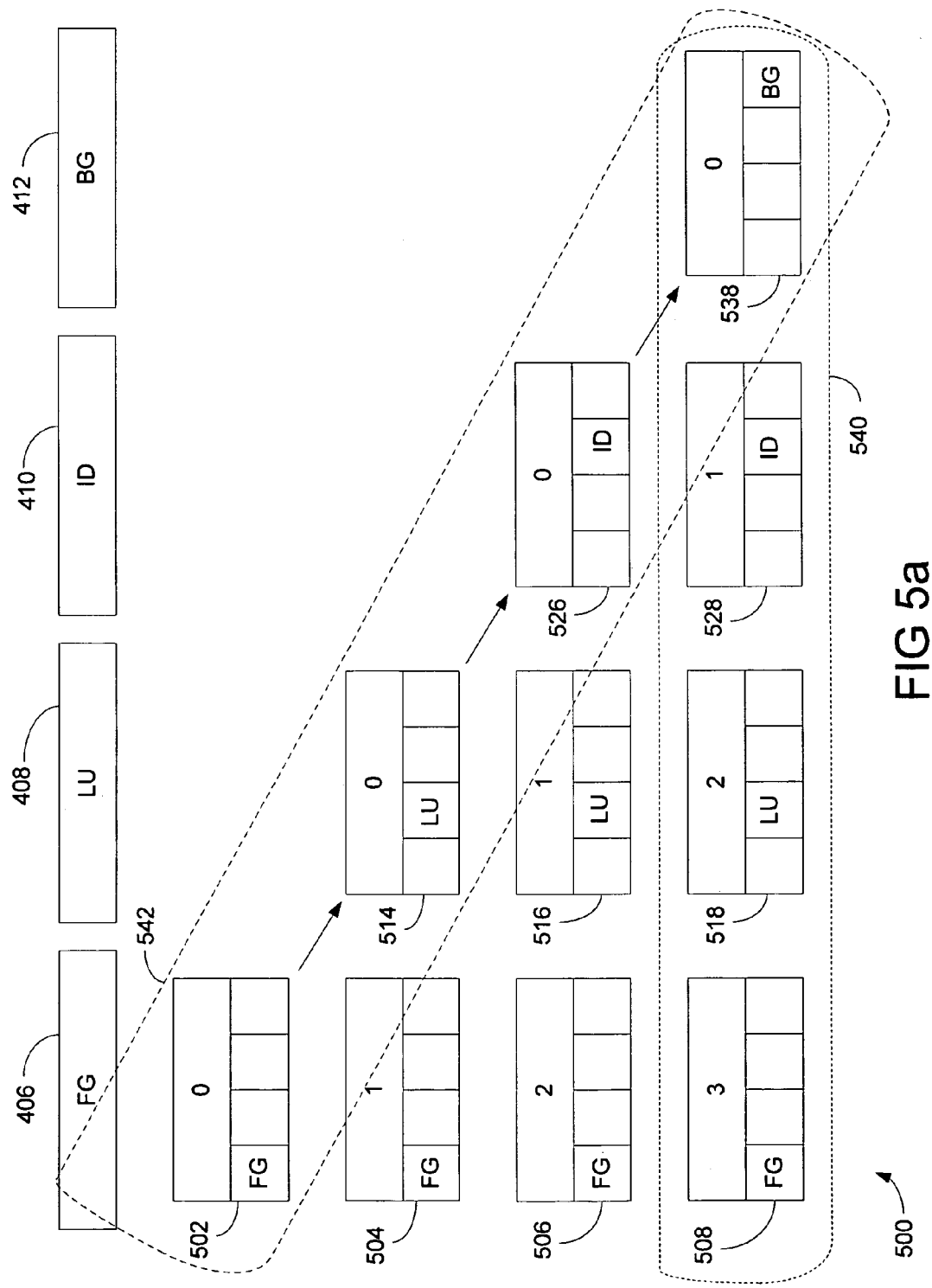

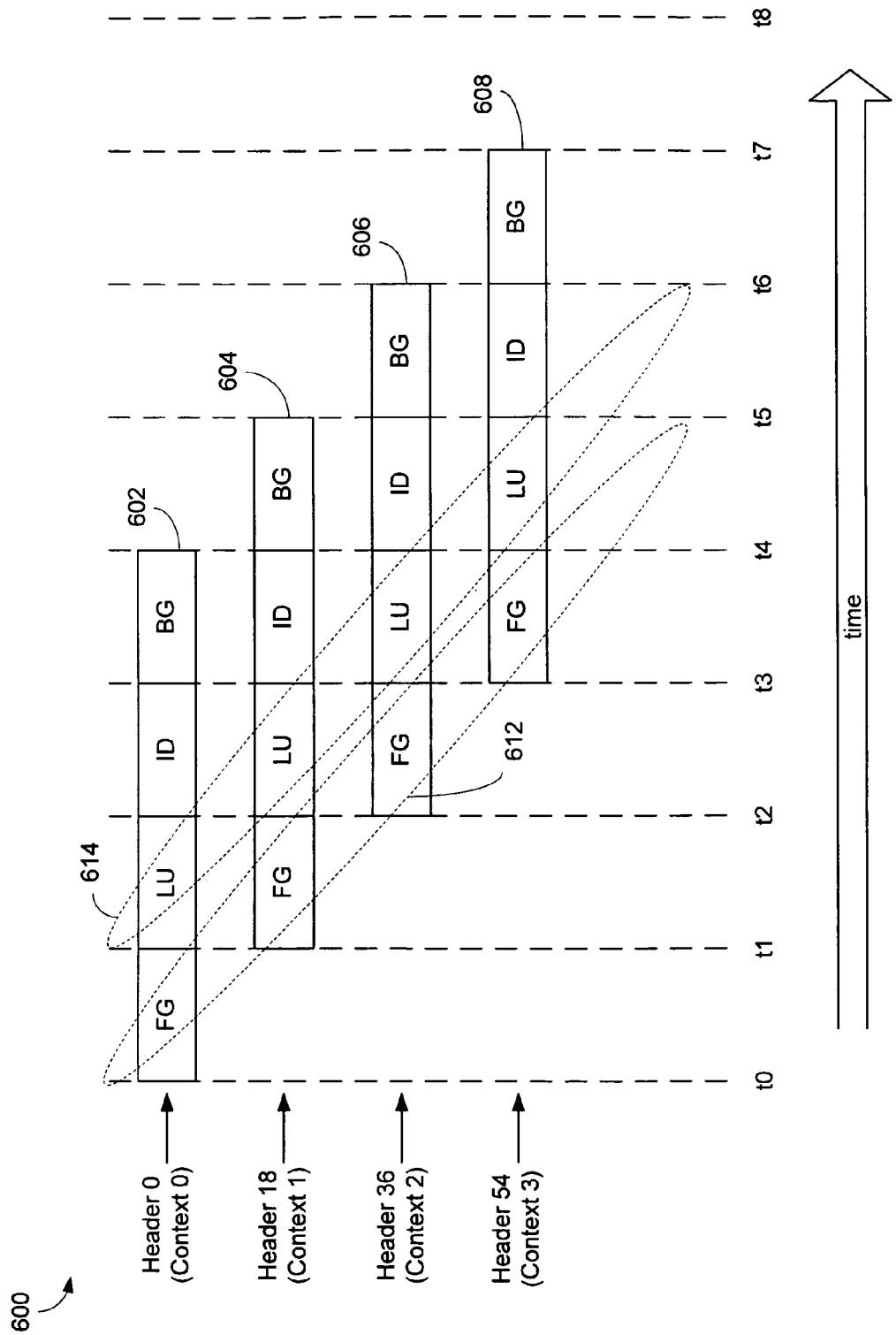

METHOD AND APPARATUS FOR IMPROVING PACKET PROCESSING PERFORMANCE USING MULTIPLE CONTEXTS

FIELD

The exemplary embodiment(s) of the present invention relates to communications network. More specifically, the embodiment(s) of the present invention relates to packet processing.

BACKGROUND

A high-speed network environment typically includes network devices such as routers and switches that facilitate delivery of information packets from source devices to destination devices. Information pertaining to the transfer of packet(s) through the network is usually embedded within one or more packets. Each packet traveling through a network can typically be treated independently from other packets in a packet stream. For example, each router within a network processes incoming packets and determines where the packet(s) should be forwarded. In a modern computing network environment, the speed of packet processing or routing can be critical in determining the performance of overall network system.

To process or route a packet, a typical router employs one of its multiple processing engines to perform packet processing, which may involve in classifying received packet, identifying results through a lookup table, performing data integrity of the packet, and so forth. A problem associated with a typical packet processing is that the processing speed of packets is usually slower than the speed of incoming packets. To make a bad situation worse, typical processing engines are often forced to idle while it is waiting for necessary data from previous stage, such as results from a CAM lookup and/or CRC result, to proceed to the next stage of the packet processing. When a processing engine(s) idles, it reduces or impacts efficiency of packet processing, and affects overall packet throughput.

A conventional approach to improve processing speed is to add additional processing engines or network processors. A drawback, however, associated with the additional processing engine(s) is added complexity of hardware, which may increase die size, power consumption, and control circuitry.

SUMMARY

A network processing device, including multiple processing engines capable of providing multi-context parallel processing, is disclosed. The device includes a receiver and a packet processor, wherein the receiver is capable of receiving packets at a predefined packet flow rate. The packet processor, in one embodiment, includes multiple processing engines, wherein each processing engine is divided into multiple independent sub-processing units, referred to as context processing components. The context processing components are capable of processing multiple packets in parallel for packets routing.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

FIGS. 5a-5b are logic diagrams illustrating a multi-context parallel processing for packet switching in accordance with one embodiment of the present invention;

FIG. 6 is a logic diagram illustrating packets traveling through context processing components in accordance with one embodiment of the present invention.

DETAILED DESCRIPTION

Figure 1:
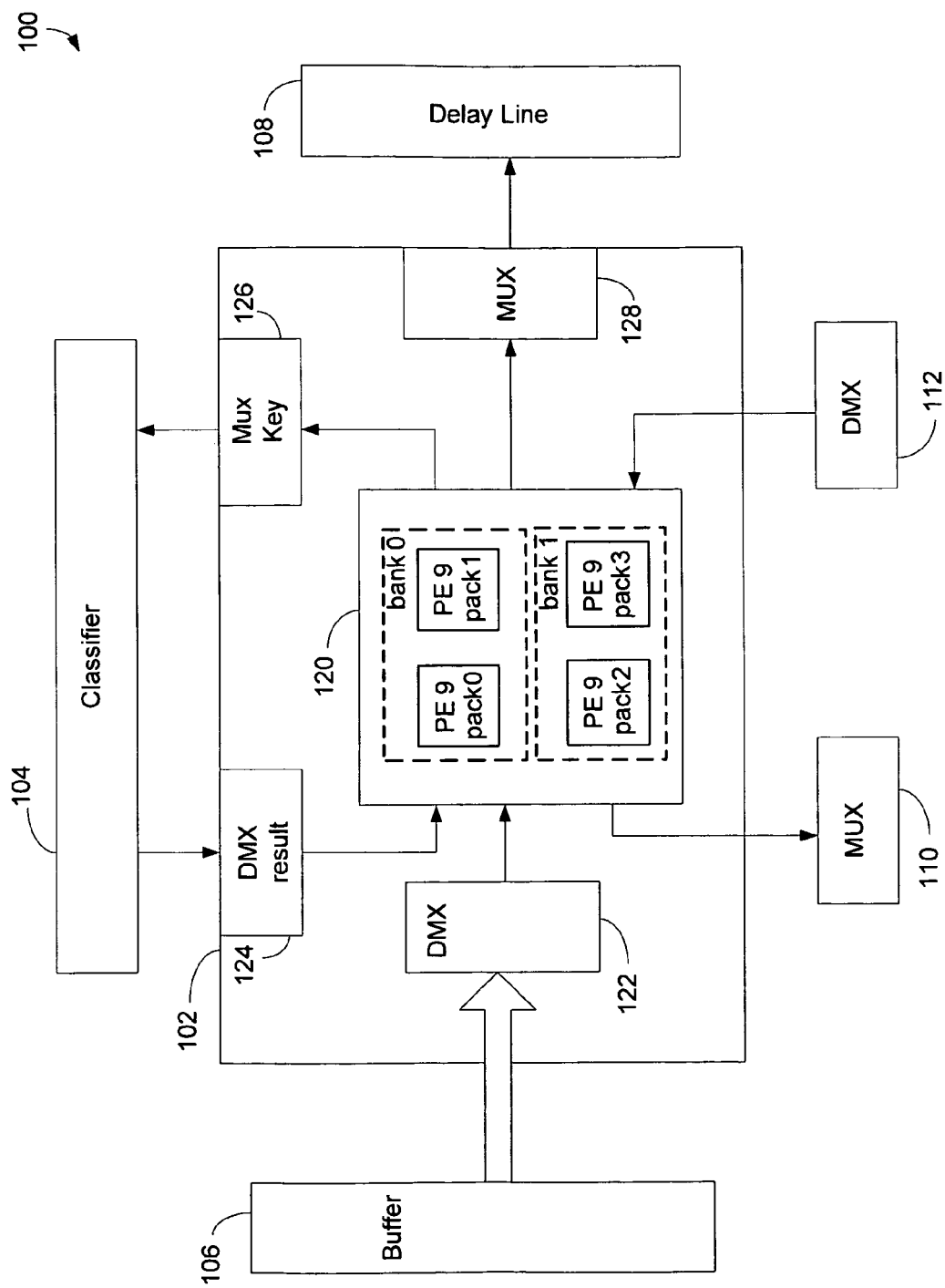
FIG. 1 is a block diagram illustrating a network processing device having multiple processing engines in accordance with one embodiment of the present invention.

Embodiment(s) of the present invention is described herein in the context of a method, device, and apparatus for improving packet processing throughput using multiple context processing components.

Those of ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skilled in the art having the benefit of this disclosure.

In accordance with the embodiment(s) of the present invention, the components, process steps, and/or data structures described herein may be implemented using various types of operating systems, computing platforms, computer programs, and/or general purpose machines. In addition, those of ordinary skilled in the art will recognize that devices of a less general purpose nature, such as hardwired devices, field programmable gate arrays (FPGAs), application specific integrated circuits (ASICs), or the like, may also be used without departing from the scope and spirit of the exemplary embodiment(s) of inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

A network processing device, including multiple processing engines ("PEs") capable of providing multi-context parallel processing, is disclosed. The device includes a receiver and a packet processor, wherein the receiver is capable of receiving packets at a predefined packet flow rate. The packet processor, in one embodiment, includes multiple processing engines, wherein each processing engine is divided into multiple independent sub-processing units, referred to as context processing components. The context processing components are capable of processing packets or portions of packets in parallel for packets routing.

FIG. 1 is a block diagram 100 illustrating a network processing device having multiple processing engines in accordance with one embodiment of the present invention. Diagram 100 includes a network processor 102, a buffer 106, a classifier 104, and a delay line 108. Additional multiplexer ("MUX") 110 and demultiplexer ("DMX") 112 may be used to connect to additional digital network processor(s). It should be noted that the underlying concept of the exemplary embodiment(s) of the present invention would not change if one or more blocks were added to or removed from diagram 100.

Network processor 102 can also be referred to as parallel processing engine, packet processing chip, network processing device, digital processing device, and the like. Processor 102, in one embodiment, includes DMXs 122-124, MUXs 126-128, and a processing unit 120, in which processing unit 120 further includes multiple banks of individual processing elements. For example, bank 0 contains a pack 0 and a pack 1 while bank 1 includes a pack 2 and a pack 3. Each pack, in one aspect, includes nine (9) processing engines ("PEs"), wherein each PE is further divided into multiple context processing components. The context processing components are capable of processing multiple packets in parallel during the same time period. The terms "pack" and "bank" can be used interchangeably thereinafter. Processor 102 may also include additional processing unit(s) and/or additional bank(s) to enhance its computing capacities. It should be noted that the underlying concept of the exemplary embodiment(s) of the present invention would not change if one or more PEs were added to or removed from packs 0-3.

While DMX 122 is used to communicate with buffer 106, MUX 128 is employed to couple to delay line 108. Processor 102 uses MUX 126 to access a Content Addressable Memory ("CAM") with a lookup key via classifier 104 and uses DMX 124 to receive result data from classifier 104. Processor 102, in one aspect, can be fabricated in a single die. Alternatively, processor 102 can be fabricated into multiple dies or combined with other circuitry.

Buffer 106, which is also known as receiving buffer, stores packets received by input port or ports before the packets are scheduled for processing. Buffer 106, in one embodiment, is capable of distributing or scheduling packet(s) to various available PEs for processing. Buffer 106 can also be back-pressured to prevent buffer 106 from forwarding additional packets if all of the PEs are busy. Depending on the application, buffer 106 is capable of storing and forwarding multiple bytes of data every clock cycle. For example, buffer 106 can store as well as forward thirty-two (32) bytes of data to DMX 122 at every clock cycle.

Classifier 104, also known as packet classification, is to categorize a packet or packets according to a set of predefined rules. To enhance line rate at a high speed information transmission, a classification lookup table is used to assist routing packet(s) from input ports to output ports. The classification lookup table includes multiple entries storing predefined results in accordance with header values. In one embodiment, the classification lookup table uses a CAM to match a packet with a result, which indicates how to route the packet. Processor 102 provides a lookup key to classifier 104 via MUX 126, and subsequently receives a result from classifier 104 via DMX 124. Upon receipt of the routing result, processor 102, in one example, forwards the packet to delay line 108. Alternatively, additional steps of processing and/or lookups can be performed if additional execution is needed.

Delay line 108 is a memory, a shift register, a first-in first-out ("FIFO") register, and/or any other types of memory devices. The size of memory capacity for delay line 108 can vary depending on the maximum lookup cycles allowed for packet processing, number of PEs, and speed of arriving packets. Delay line 108 is used to guarantee that the packets exiting a router have the same sequence as the packets entering the router. Delay line 108 further allows the content of a stored packet to be updated or rewritten in response to the content of a processed packet. An advantage of using a delay line is to improve throughput of PEs. It should be noted that packets which get classified early come out of PE early and thus are not in the same order in which they entered PE. Delay line 108 allows and assists PE's to put packets in order, which allows more packets to be processed.

Diagram 100 shows an aspect of a packet processing device capable of handling multiple packets at the same time. For example, when an input port of the packet processing device receives a packet header, which, for instance, composes 192 bytes of packet control information, the packet processing device distributes the header to an available PE to determine where the packet should be routed. If a system data bus situated between buffer 106 and processing unit 120 is a 256-bit or 32-byte wide bus, 192 bytes of header information should take six (6) clock cycles for the bus to transfer a complete packet header to processing unit 120. It should be noted that if processing unit 120 contains 36 PEs capable of processing packets under a TDM (Time-division multiplexing) mode, every PE needs to be ready to receive next packet after 216 clock cycle. The packet processing device is capable of receiving 32 bytes per clock cycle, and the entire header of 192 bytes will take 6 clock cycles to transfer. Processing unit 120, in one aspect, includes four (4) packs organized in two banks wherein each pack includes nine (9) PEs. With 36 PEs capable of parallel processing, 36 packets can be processed simultaneously. Since time needed to transfer 36 packets from input ports to 36 PEs is 216 (36 packets×6 cycles=216) clock cycles, the next packet or $37^{th}$ packet is ready to be processed after 216 clock cycles.

Network routing software generally needs 108 clock cycles for bit processing or bit manipulation for a packet. Since each CAM lookup or CAM latency is estimated 300 clock cycles, obtaining a routing result from CAM lookup based on two lookup cycles requires 816 (300+300+216) clock cycles. As such, processing a packet, in this instance, requires at least 816 clock cycles. With 36 PEs and the $37^{th}$ packet arriving after 216 clock cycles, it is critical for each PE to handle multiple packets in order to perform at the line rate. Accordingly, each PE is divided into multiple contexts processing components. Multiple contexts increase the effective number of processing elements and the capability of executing multiple packets in parallel.

An advantage of implementing the exemplary embodiment(s) of the present invention is to modify each PE to handle multiple threads (i.e. make it capable of multi-processing). Each PE is able to process multiple packets in parallel. In a course of processing a packet, if a data dependency event is encountered, the 'context' for the processing thread is saved and the PE can switch to another 'context' (processing thread for a different packet) and continue to process the next packet. As such, multiple context processing components improve packet processing efficiency, wherein for data-dependency situations, the processing components should be matched with number of contexts.

Figure 2:
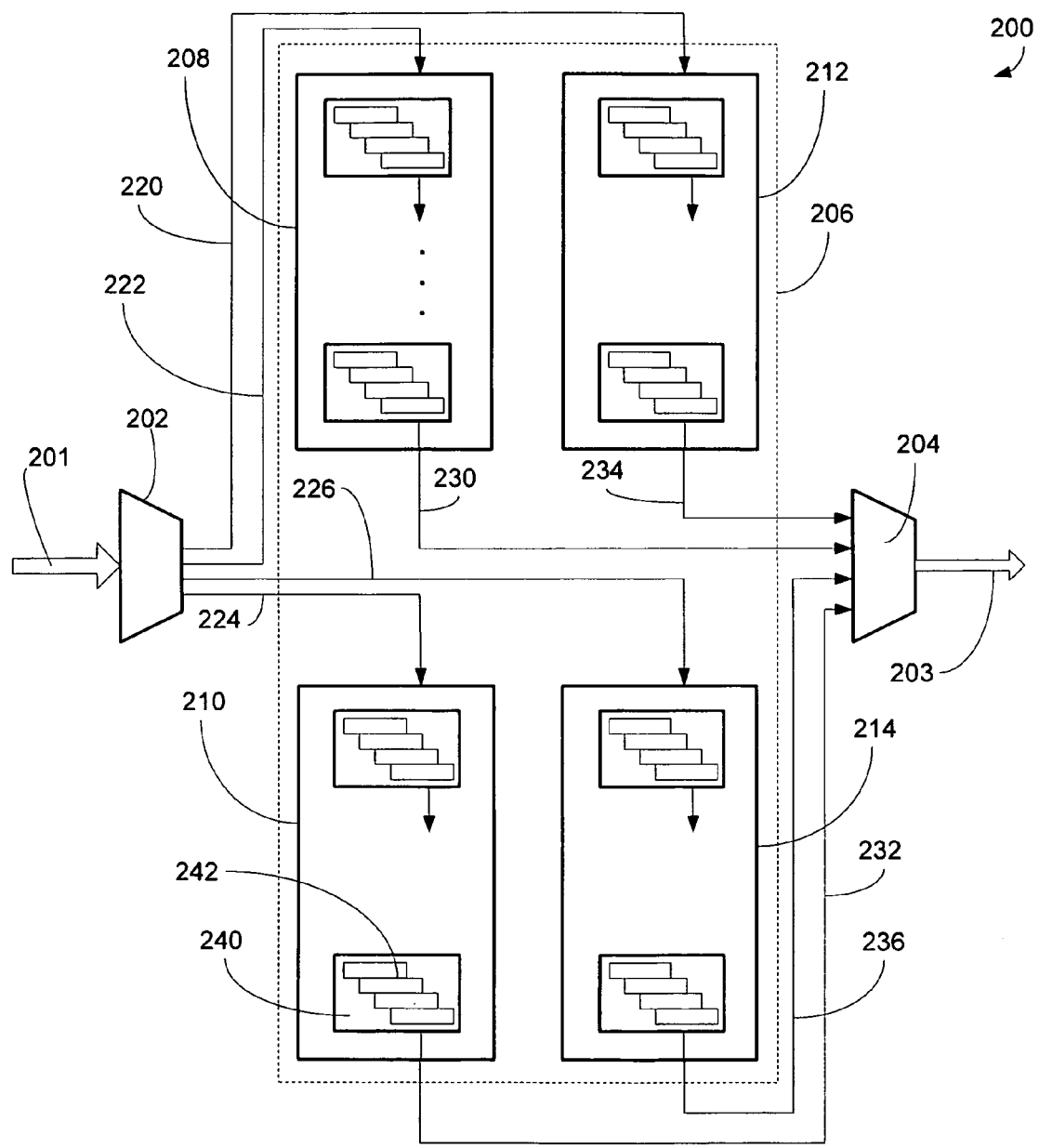
FIG. 2 is a block diagram of processing system illustrating packet processing engines capable of implementing multi-context processing in accordance with one embodiment of the present invention.

FIG. 2 is a block diagram of processing system 200 illustrating packet processing engines capable of implementing multi-context processing in accordance with one embodiment of the present invention. Processing system 200 includes a demux 202, a mux 204, and a processing device 206, wherein processing device 206 further includes four (4) banks or packs of processing elements and/or PEs 208-214. A benefit of organizing PEs into a multi-banks configuration is to improve latency. For example, instead of receiving output packets from the last PE in bank 214 via bus 236, mux 204 can receive output packets from all banks 208-214 via bus 230-236. It should be noted that the underlying concept of the exemplary embodiment(s) of the present invention would not change if one or more blocks were added to or removed from system 200.

Each bank may include multiple PEs, such as eight (8), nine (9), sixteen (16), and so on. It should be noted that the number of PEs does not have to be in power of 2. PEs inside pack are in daisy chain and then output of last PE directly goes to a output mux. Demux 202, in one embodiment, is capable of distributing four packet streams to inputs of four packs 208-214 via buses 220-226. Mux 204 is configured to receive four output packet streams from four packs 208-214 via buses 230-236. For example, demux 202 uses buses 220-226 to distribute input data packets to packs 208-214. Upon receipt of output data packets from buses 230-236, mux 204 generates an output packet stream in accordance with the output data packets, and subsequently, transmits the output packet stream to external devices via bus 203.

System 200, in one embodiment, includes a global clock tree that is used to distribute clock signals to various components including every PE in each bank and/or pack. Each PE in a bank is assigned a designated time frame for data accessing. A unique designated time frame is assigned to each PE. In another embodiment, the clock stamp(s) distributed by the clock tree is encoded in the packet stream whereby each PE can verify time accurately.

In operation, upon receipt of data packets over bus 201, demux 202 is capable of decomposing the data packets to form four separate packet streams. Four packet streams are subsequently sent to banks or packs 208-214 using buses 220-226. After arrival of the packet streams, PEs in each bank or pack process the packet stream in accordance with the designated time frames. It should be noted that packet stream may carry data packets for input as well as for output when it travels through the bank. Mux 204 collects output packet streams from banks 208-214 via buses 230-236 and combines output packet streams to form an output stream, which is subsequently sent to external devices via bus 203.

In one embodiment, each PE 240 within packs 208-214 is further configured to include multiple context processing components 242. For example, each PE 240 includes a foreground ("FG") context processing component, a lookup ("LU") context processing component, an identification ("ID") context processing component, and a background ("BG") context processing component. Each of the FG, LU, ID, and BG context processing components is able to process at least a portion of a packet independently from other context processing components. Depending on applications, additional context processing components may be added to or removed from PE 240.

Figure 3:
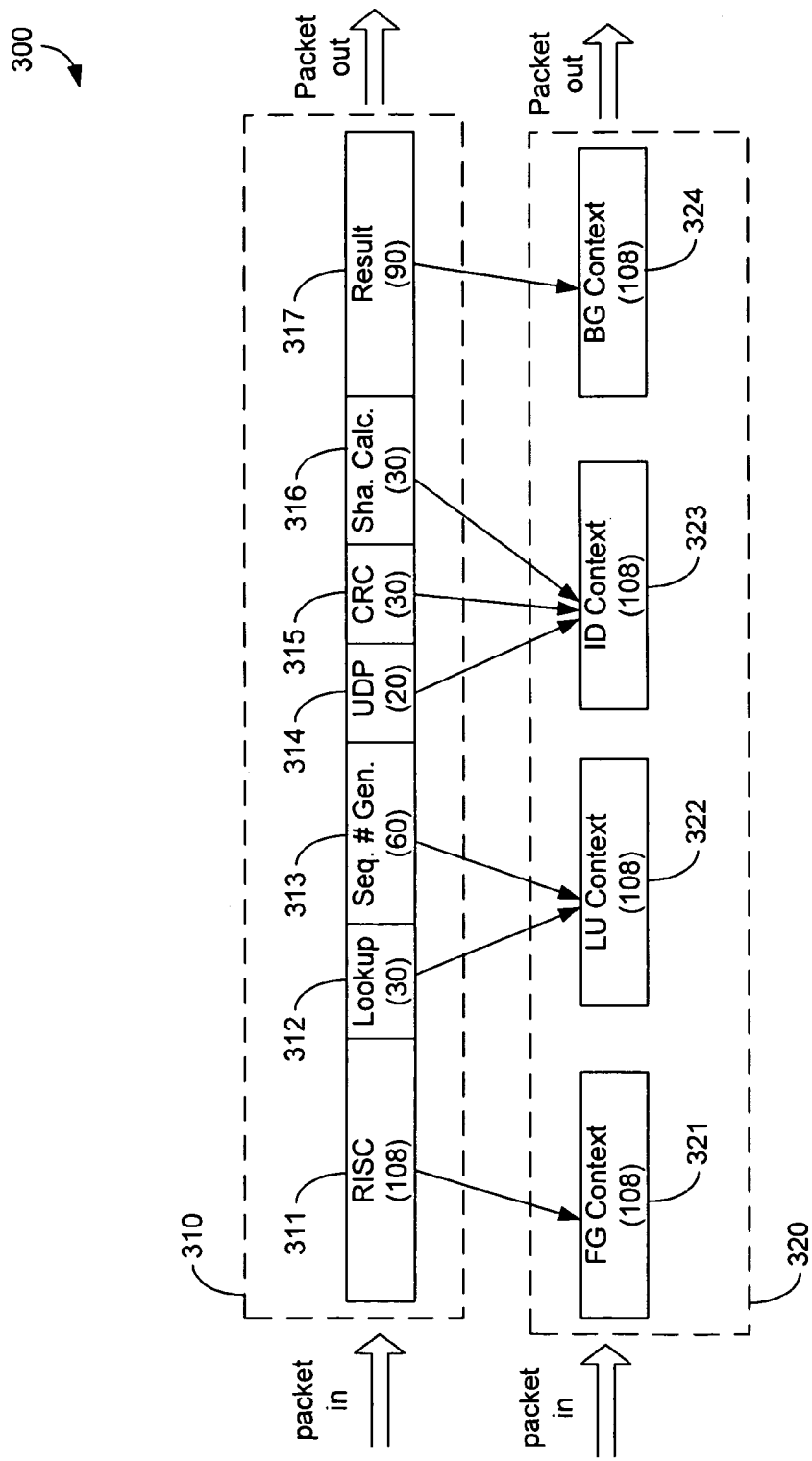
FIG. 3 a block diagram illustrating context processing components in accordance with one embodiment of the present invention.

FIG. 3 is a block diagram 300 illustrating context processing components in accordance with one embodiment of the present invention. Diagram 300 includes a PE 310 capable of processing a packet in a sequence through its various functional circuits and a PE 320 organized in four context processing components. In one aspect, a packet is to be processed by PE 310 sequentially through various function blocks, such as CAM key generations and CRC calculations. It should be noted that the underlying concept of the exemplary embodiment(s) of the present invention would not change if one or more blocks were added to or removed from diagram 300.

PE 310 includes a RISC (reduced instruction set computer) processor 311, a lookup circuitry 312, a sequence number generator 313, a UDP (User Datagram Protocol) checksum 314, a CRC (cyclic redundancy checksum) 315, a Sha calculator 316, and a result circuit 317. While RISC processor 311 provides bit/byte wise packet processing, sequence number generator 313 provides a sequence number to keep track of a packet. Lookup circuitry 312 is used to generate a lookup key, which is subsequently used to access a CAM. To maintain data integrity, UDP 314, CRC 315, and/or Sha calculator 316 may be used for providing checksum based on packet protocols. Result circuit 317 is used to add more lookups/routes the packet in accordance with the result received from a result memory. It should be noted that PE 310 may include other functions, such as packet input, key generator and packet output.

PE 320, in one embodiment, includes a foreground ("FG") context processing component 321, a lookup ("LU") context processing component 322, an identification ("ID") context processing component 323, and a background ("BG") processing component 324. It should be noted that PE 320 may include additional context processing components depending on applications. Context processing components 321-324 are capable of processing one or more packets simultaneously or in parallel while each packet is processed by different context processing components in pipeline. In one aspect, every context processing component is configured to complete its operation within a predefined time period such as 108 clock cycles. At any given time, one context, for example, can process one packet each.

Diagram 300 illustrates an example of mapping various functions performed by PE 310 to context processing components 321-324. As indicated by arrows in FIG. 3, FG context processing component 321 is capable of performing functions similar to functions performed by RISC processor 311, while LU context processing component 322 is capable of performing functions similar to functions performed by lookup circuitry 312 and sequence number generator 313. While UDP checksum 314, CRC 315, and Sha calculator 316 may be merged into ID context processing component 323, result circuit 317 may be mapped into BG context processing component 324. It should be noted that the underlying concept of the exemplary embodiment(s) of a routing device would not change if different circuitry is mapped into different context processing components.

A PE is capable of processing a packet, wherein the process may involve in a series of steps, such as CAM key generation, UDP checksum, CRC calculation, CAM result processing, sequence number generation, and so on. As mentioned earlier, processing elements can be divided into multiple context processing components or elements, wherein each context processing component is configured to complete its task(s) within one context period, which, in one example, is 108 clock cycles. RISC processor of FG context processing component 321, for instance, has up to 108 clock cycles to process bit/byte wise packet data. While LU context processing component 322 generates a CAM key in accordance with a packet header, ID context processing component 323 provides CRC, UDP, and Sha checksum calculation. BG context processing component 324 provides result processing and some other functions such as memory resetting as well as packet outputting.

It should be noted that each packet goes through each context to finish lookup cycle. Once a PE is done with processing a packet in a context, the PE starts to process another packet for the same context while present packet enters into the next context. The exemplary embodiment of processing device configures each PE as multiple "virtual" engines or multi-contexts or multiple context processing components. To increase throughput of packet processing, the exemplary processing device employs each engine as four (4) "virtual" engines or contexts. Each context or context processing component has its own configurable registers and memory to process a packet. It should be noted that each PE is configured to do many processing functions.

During an operation, a processing device includes a network processor having 36 PEs or engines, wherein the device can process 36×4(context)=144 packets in parallel. A packet, for instance, may take 144(packets)×6 (packet enters every 6 cycle)=864 clock cycles to process, which includes two (2) lookup cycles. In the event that some packets need additional lookup(s) to complete its lookup cycle, the device backpressures or instructs the receiving buffer not to send additional packet until the current packet is processed. The processing device, in one embodiment, is capable of processing packets at every six cycles as long as each packet requires two or less lookup cycles to complete its routing.

Figure 4:
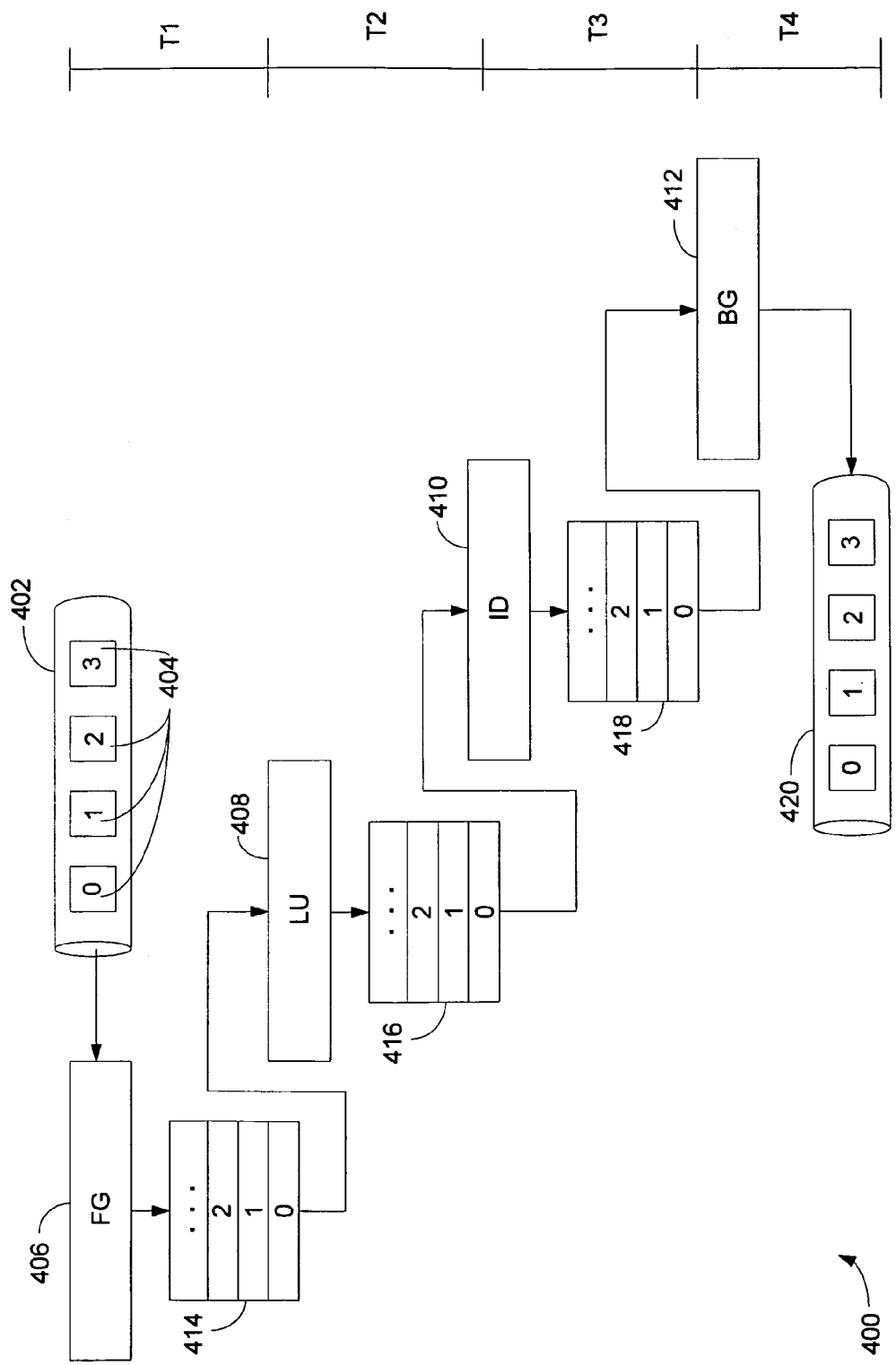
FIG. 4 is a block diagram illustrating a packet processing engine having four context processing components capable of processing in parallel in accordance with one embodiment of the present invention.

FIG. 4 is a logic block diagram 400 illustrating a packet PE having four context processing components capable of processing in parallel in accordance with one embodiment of the present invention. Diagram 400 includes an input packet stream 402, context processing components 406-412, memories 414-418, and an output packet stream 420. It should be noted that memory 414-418 points to same physical memory but just shown multiple times for clarity. Each memory of each PE has four subdivision for 4 context. Packet stream 402 includes packets 0, 1, 2, and 3, while output packet stream 420 includes processed packets 0, 1, 2, and 3. It should be noted that the underlying concept of the exemplary embodiment(s) of the present invention would not change if one or more blocks were added to or removed from diagram 400.

The PE includes a FG context processing component 406, a LU context processing component 408, an ID context processing component 410, and a BG context processing component 412. It does not alter the concept of the embodiment(s) of the present invention if additional context processing components are added to or removed from the PE. FG context processing component 406 further includes one or more digital processing elements capable of processing header information including bit/byte wise manipulation. For instance, a lookup key may be generated in accordance with at least a portion of header information. FG context processing component 406, for example, receives a packet header such as packet 0 of packet stream 402 at T1 and subsequently generates a FG context result in response to the packet header. After generating the FG context result, it is stored in a memory component 414 before the end of T1. The FG context result, in one example, includes information relating to a partially processed packet header, such as information relating to a processed FG context. It should be noted that T1, T2, T3, and T4, for example, may last 108 clock cycles. In an alternative embodiment, FG context processing component 406 is coupled to a memory or a context memory for receiving new packets.

At T2, LU context processing component 408 fetches the FG context result (context 0 partially processed packet), which is partially processed by FG context processing component 406, from memory component 414 and produces a LU context result in response to the FG context result. After generating the LU context result, it is stored in memory component 416 (in context 0 part of physical memory) before the end of T2. LU context processing component 408, in one embodiment, is configured to generate a sequence number for tracking the packet. It should be noted that memory components 414, 416, and 418 could be the same storage memory separated by context sections such as context memory 0, 1, 2, and so on. In one aspect, context memory 1 is designated to packet 1 while context memory 2 is designated to packet 2. For, example, memory component 414 may contain multiple context sections wherein space 0 indicates context memory 0 while space 1 indicates context memory 1.

At T3, ID context processing component 410 obtains the LU context result, which is partially processed by FG and LU context processing components 406-408, from memory component 416 and generates an ID context result in response to the LU context result. After generating the ID context result, it is stored in memory component 418 before the end of T3. ID context processing component 410, in one embodiment, is configured to perform a checksum using UDP, CRC, or Sha calculation depending on the packet protocol. It should be noted that ID context processing component 410 may include additional logic blocks and perform additional function(s) accordingly.

At T4, BG context processing component 412 fetches the ID context result, which is partially processed by FG, LU, and ID context processing components 406-410, from memory component 418 and generates a processed packet in response to the ID context result. The processed packet is subsequently forwarded to an output buffer or delay line. BG context processing component 412, in one embodiment, is configured to perform CAM result processing, packet outputting, memory resetting, and so on. In an alternative embodiment, the result generated by BG context processing component 412 is stored in a memory component or context memory, not shown in FIG. 4, before the end of T4. It should be noted that BG context processing component 412 may perform additional function(s).

An advantage of using multiple context processing components within each PE is to pipeline a packet through context processing components while simultaneously processing multiple packets. Instead of adding more PEs to complete processing a packet every 216 clock cycles, multiple context processing components allow packet(s) to enter the PE without interrupting the processing of previous packet(s) and achieving higher packet processing throughput.

FIG. 5*a* is a logic diagram 500 illustrating a multi-context parallel processing for packet switching in accordance with one embodiment of the present invention. Diagram 500 illustrates packet status blocks 502-538 and a PE having a FG context processing component 406, a LU context processing component 408, an ID context processing component 410, and a BG context processing component 412. It should be noted that the underlying concept of the exemplary embodiment(s) of the present invention would not change if one or more blocks were added to or removed from diagram 500.

Diagram 500 illustrates packet status units 540-542, wherein status unit 540 includes packet status blocks 508, 518, 528, and 538. Unit 540 shows that different portions of four different packets 0, 1, 2, 3 are being parallel processed by different context processing components 406-412 at the same or substantially the same time period or time frame. Unit 542 includes packet status block 502, 514, 526, and 538, which represent four different portions of packet 0 are being processed by different context processing components at four consecutive time periods. Diagram 500 illustrates a packet such as packet 0, which is processed in pipeline by four different context processing components 406-412 at different time, while packets 0-3 are processed in parallel by four different context processing components 406-412 at the same time.

Figure 5B:
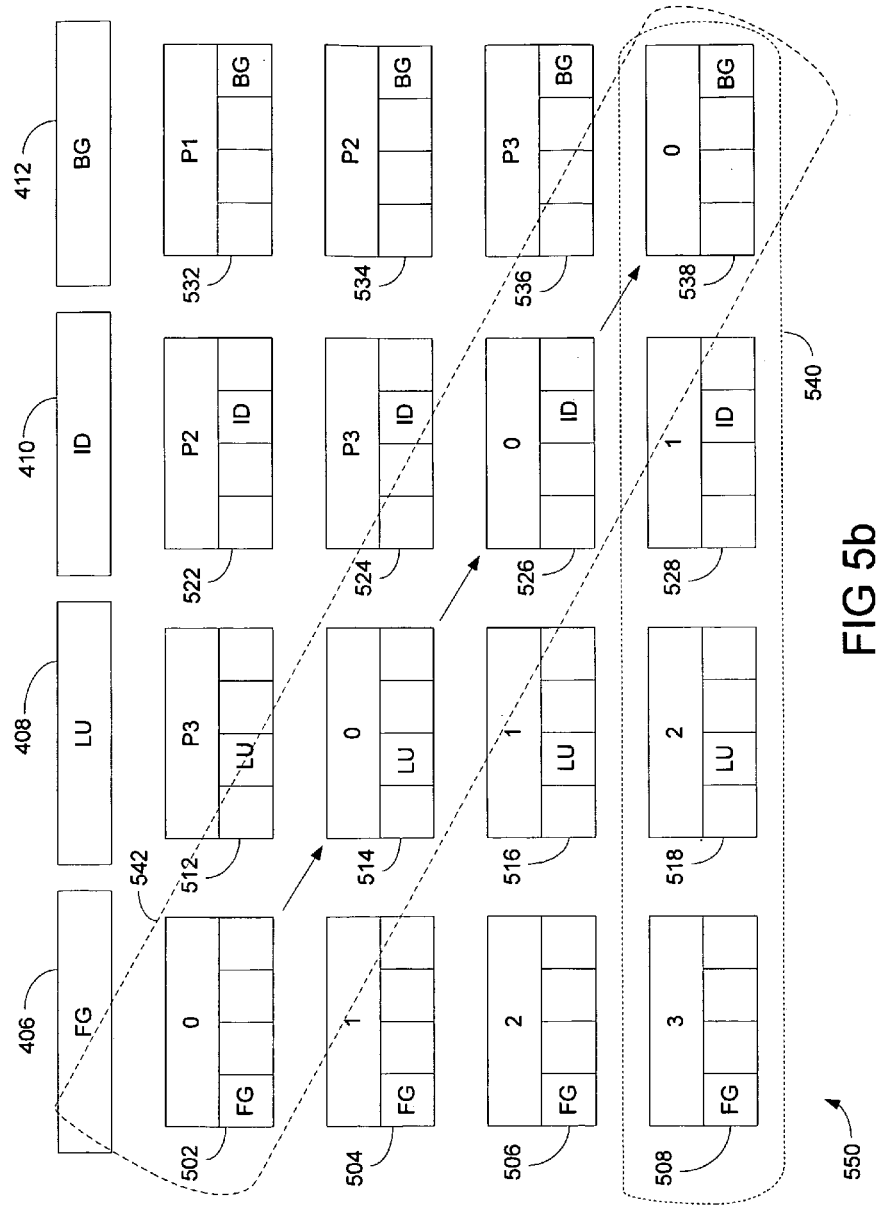

FIG. 5*b* is a logic diagram 550 illustrating an alternative example of processing packets using multi-context parallel processing in accordance with one embodiment of the present invention. Diagram 550 illustrates packet status blocks 502-538 and a PE having a FG context processing component 406, a LU context processing component 408, an ID context processing component 410, and a BG context processing component 412. Diagram 550 illustrates a group of previous packet status unit including packets P1, P2, and P3, which include packet status blocks 512, 522, 524, 532, 534, and 536. Packets P3, P2, and P1 are received and processed before the arrival of packet 0. In this embodiment, context results of every packet are stored in the context memory and the context results can be fetched and processed when a context processing component(s) becomes available. For instance, if a PE is capable of parallel processing up to four packets, four (4) context memories, such as context 1, 2, 3, and 4, may be established to handle the packet results.

FIG. 6 is a logic diagram 600 illustrating packets traveling through a PE having context processing components in accordance with one embodiment of the present invention. In one embodiment, a router contains 36 PEs and is capable of processing a packet per every 216 clock cycles. As such, each PE of the 36 PEs is required to handle a new packet every 36 packets. Diagram 600 shows four packet headers 0, 18, 36, and 54 arriving at a PE assuming a network processor has 36 PEs. Header 0, 18, 36, and 54, in one embodiment, are stored in context or context memory 0, 1, 2, and 3, respectively. Different context processing components process different portions or contexts of packets. For example, label 612 indicates that FG context processing component processes FG portions of header 0, 18, 36, and 54 at t0, t1, t2, and t3, respectively. Similarly, label 614 indicates that LU context processing component processes LU portions of header 0, 18, 36, and 54 at t1, t2, t3, and t4, respectively. It should be noted that the underlying concept of the exemplary embodiment(s) of the present invention would not change if one or more context processing components were added to or removed from diagram 600.

The exemplary embodiment(s) of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. In another embodiment, the steps of the exemplary embodiment of the present invention may be performed by specific hardware components that contain hard-wired logic for performing the steps, or by any combination of programmed computer components and custom hardware components.

Figure 7:
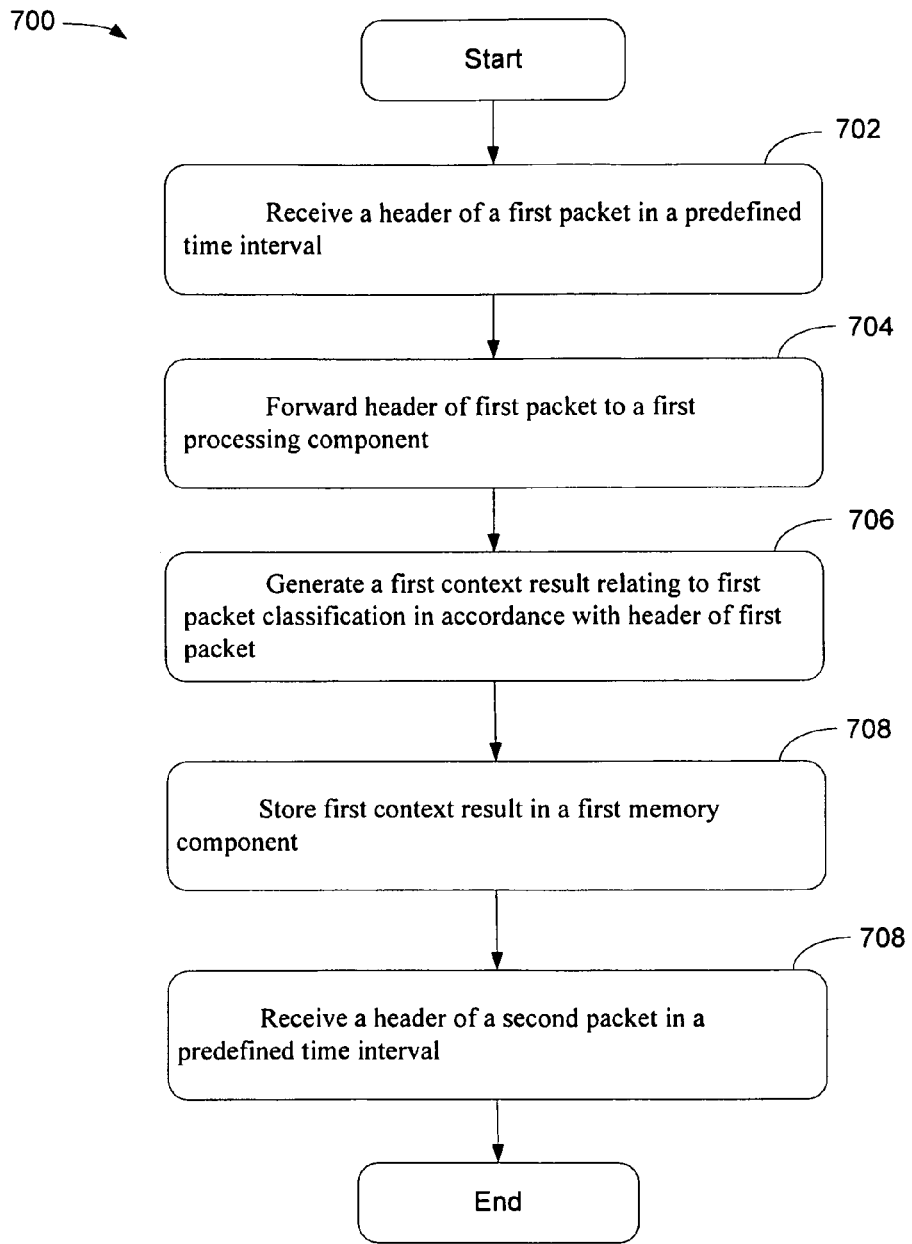
FIG. 7 is a flowchart illustrating a multi-context parallel processing for packet routing in accordance with one embodiment of the present invention.

FIG. 7 is a flowchart 700 illustrating a multi-context parallel processing for packet routing in accordance with one embodiment of the present invention. At block 702, a process receives a header of a first packet in a predefined time interval. In one embodiment, the predefined time interval lasts 216 clock cycles. After block 702, the process proceeds to the next block.

At block 704, the process forwards the header of the first packet to a first processing component. For example, the first processing component is a FG context processing component, which includes memory and register and accomplishes its task(s) within a predefined period. In one embodiment, the predefined period lasts 108 clock cycles. After block 704, the process proceeds to the next block.

At block 706, the process generates a first context result relating to first packet classification in accordance with the header of the first packet. In one embodiment, the process provides packet bit manipulation and header data analysis. After block 706, the process proceeds to the next block.

At block 708, the process stores the first context result in a first memory component. In one example, the first memory component is also referred to as first context memory. After block 708, the process proceeds to the next block At block 710, the process receives a header of a second packet in the predefined time interval. In one embodiment, upon fetching the first context result from the first memory component and forwarding the first context result to a second processing component, the process generates a second context result in accordance with a lookup table stored in a memory. The second context result is subsequently stored in a first memory component (first context). After fetching the second context result from the first memory component and forwarding the second context result to a third processing component, the process generates a third context result relating to data integrity in accordance with the second context result and stores the third context result in a first memory/context component. Upon fetching the third context result from the first memory component and forwarding it to a fourth processing component, the process generates a fourth context result relating to routing information in accordance with the third context result. In one embodiment, the process is capable of facilitating the first, the second, the third, and the fourth processing components to process packets at the same or substantially the same time period. After block 710, the process ends.

While particular embodiments of the present invention have been shown and described, it will be obvious to those skilled in the art that, based upon the teachings herein, changes and modifications may be made without departing from this exemplary embodiment(s) of the present invention and its broader embodiments. Therefore, the appended claims are intended to encompass within their scope all such changes and modifications as are within the true spirit and scope of this exemplary embodiment(s) of the present invention.

What is claimed is:

1. A network processing device, comprising:
a receiver capable of receiving packets at a predefined packet flow rate; and
a packet processor coupled to the receiver and capable of delivering a processing speed which is substantially same speed as the predefined packet flow rate, wherein the packet processor is configured to include a plurality of processing engines, each processing engine configured to include a first, a second, a third, and a fourth context processing components, each completing assigned tasks for a received packet within a predefined time period;
wherein the first context processing component performs a classification function of a first packet and stores a first result in a memory component within a first predefined time period, the second context processing component performs a memory lookup function in response to the first result stored in the memory component and stores a second result from the memory lookup in the memory component within a second predefined time period, the third context processing component performs data integrity procedures in response to the second result stored and stores a third result from the data integrity procedures in the memory component within a third predefined time period, and the fourth context processing component fetches the third result and is capable of providing a routing result relating to the first packet in response to the third result within a fourth predefined time period.

2. The device of claim 1, wherein each processing engine includes a plurality of memory components capable of storing partially processed packet information, wherein each context processing component is associated with at least one of the plurality of memory components.

3. The device of claim 2, wherein the plurality of context processing components is operable in a pipeline configuration for processing a packet.

4. The device of claim 3, wherein the plurality of context processing components is configured to store processing result in one of the plurality of memory components.

5. The device of claim 1, further comprising a delay line coupled to the processing engine and configured to guarantee that exiting packets have same sequence as entering packets.

6. The device of claim 1,
wherein the plurality of processing engines includes thirty-six (36) digital processing unit; and
wherein the plurality of context processing components includes four (4) network context processing elements.

7. A method of processing a packet, comprising:
receiving a first packet arrived from a communication line via an input port and sending the first packet from a receiver to a packet processor at an approximately line rate;
identifying a first processing engine from a plurality of processing engines in the packet processor to process the first packet;
determining a first processing component from a plurality of processing components in the first processing engine and forwarding a header of the first packet to the first processing component;
generating a first context result within a first predefined time period in accordance with the header of the first packet and storing the first context result relating to first packet classification in a first memory component;
receiving a header of a second packet at the approximately line rate;
fetching the first context result from the first memory component and forwarding the first context result to a second processing component;
generating a second context result relating to access lookup table in a memory in accordance with the first context result within a second predefined time period and storing the second context result in a first memory component;
fetching the second context result from the first memory component and forwarding the second context result to a third processing component;
generating a third context result relating to data integrity in accordance with the second context result within a third predefined time period and storing the third context result in a first memory component;
fetching the third context result from the first memory component and forwarding the third context result to a fourth processing component;
generating a fourth context result relating to routing information in accordance with the third context result within a fourth predefined time period; and providing the routing information for the first packet.

8. The method of claim 7, further comprising facilitating the first processing component, the second processing component, the third processing component, and the fourth processing component to process multiple packets at a substantially simultaneous time period.

9. A processing engine comprising:
a receiver operable to receive a first packet;
a packet processor coupled to the receiver and capable of receiving and processing a packet at a line rate, wherein the packet processor includes a plurality of processing engines, wherein each of the plurality of processing engines includes a plurality of processing components;
a first processing component of the plurality of processing components configured to perform a function relating to classification of the first packet within a first predefined time period, wherein the first processing component stores a classification result in the first memory component;
a second processing component of the plurality of processing components coupled to the first memory component and capable of fetching the classification result from the first memory component, wherein the second processing component performs a lookup function in response to the classification result within a second predefined time period and stores a lookup result in a first memory component;
a third processing component of the plurality of processing components coupled to the second processing component and capable of obtaining the lookup result from the first memory component, wherein the third processing component is capable of providing a function of data integrity within a third predefined time period and storing checksum information in a first memory component; and
a fourth processing component of the plurality of processing components coupled to the third processing component and capable of obtaining the checksum information from the first memory component, wherein the fourth processing component is capable of providing a routing information relating to the first packet within a fourth predefined time period.

10. The engine of claim 9, wherein the first, second, third, and fourth processing components are capable of processing multiple packets in parallel.

11. The engine of claim 9, wherein the first, second, third, and fourth processing components are capable of processing four packets at a substantially same time.

12. An apparatus of processing a packet, comprising:
- means for receiving a first packet arrived from a communication line via an input port; and means for sending the first packet from a receiver to a packet processor at an approximately line rate;
- means for identifying a first processing engine from a plurality of processing engines in the packet processor to process the first packet;
- means for determining a first processing component from a plurality of processing components in the first processing engine; and means for forwarding a header of the first packet to the first processing component;
- means for generating a first context result within a first predefined time period in accordance with the header of the first packet;
- means for storing the first context result relating to first packet classification in a first memory component;
- means for receiving a header of a second packet at the approximately line rate;
- means for fetching the first context result from the first memory component and means for forwarding the first context result to a second processing component;
- means for generating a second context result relating to access lookup table in a memory in accordance with the first context result within a second predefined time period; and means for storing the second context result in a first memory component;
- means for fetching the second context result from the first memory component; and means for forwarding the second context result to a third processing component;
- means for generating a third context result relating to data integrity in accordance with the second context result within a third predefined time period and means for storing the third context result in a first memory component;
- means for fetching the third context result from the first memory component and forwarding the third context result to a fourth processing component; and
- means for generating a fourth context result relating to routing information in accordance with the third context result within a fourth predefined time period; and means for providing the routing information for the first packet.

13. The apparatus of claim 12, further comprising means for facilitating the first processing component, the second processing component, the third processing component, and the fourth processing component to process multiple packets at a substantially simultaneous time period.

* * * * *